United States Patent
Cox et al.

(10) Patent No.: US 12,308,598 B2
(45) Date of Patent: May 20, 2025

(54) CAPPED BLOCKING COATING FOR LASER OPTICS

(71) Applicant: CORNING INCORPORATED, Corning, NY (US)

(72) Inventors: Gerald Philip Cox, Brockport, NY (US); Thomas Edward Gebo, Scottsville, NY (US)

(73) Assignee: Corning Incorporated, Corning, NY (US)

( * ) Notice: Subject to any disclaimer, the term of this patent is extended or adjusted under 35 U.S.C. 154(b) by 605 days.

(21) Appl. No.: 17/690,311

(22) Filed: Mar. 9, 2022

(65) Prior Publication Data
US 2022/0311200 A1  Sep. 29, 2022

Related U.S. Application Data

(60) Provisional application No. 63/164,755, filed on Mar. 23, 2021.

(51) Int. Cl.
*H01S 3/22* (2006.01)
*H01S 3/034* (2006.01)
*H01S 3/225* (2006.01)

(52) U.S. Cl.
CPC .......... *H01S 3/0346* (2013.01); *H01S 3/225* (2013.01); *H01S 3/2251* (2013.01); *H01S 3/2253* (2013.01); *H01S 3/2255* (2013.01); *H01S 3/2256* (2013.01); *H01S 3/2258* (2013.01)

(58) Field of Classification Search
CPC ...... H01S 3/0346; H01S 3/225; H01S 3/2251; H01S 3/2253; H01S 3/2255; H01S 3/2256; H01S 3/2258
See application file for complete search history.

(56) References Cited

U.S. PATENT DOCUMENTS 10,459,134 B2  10/2019  Cangemi et al.
10,578,785 B2   3/2020  Cangemi et al.
(Continued)

FOREIGN PATENT DOCUMENTS

WO  2017/031179 A1  2/2017

OTHER PUBLICATIONS

International Search Report and Written Opinion of the International Searching Authority; PCT/US2022/019423; mailed on Jun. 28, 2022, 12 pages; European Patent Office.

*Primary Examiner* — Kinam Park
(74) *Attorney, Agent, or Firm* — Amy T. Lang

(57) ABSTRACT

Methods, systems, and devices are described. A system may include an optically transmissive substrate having a protective coating on a first surface and a blocking coating on a second surface that is opposite the first surface. The protective coating is configured to protect the optically transmissive substrate from at least ultraviolet laser energy, and the blocking coating has a first thickness that is less than about 280 nanometers and is adhered to a subset of the second surface. The system further includes a capping layer covering the blocking coating that is on the subset of the second surface and having a second thickness less than the first thickness of the blocking coating. Additionally, the system includes a sealing component positioned between the capping layer and a structure configured to support the optically transmissive substrate.

20 Claims, 7 Drawing Sheets

(56) References Cited

U.S. PATENT DOCUMENTS

| | | | |
|---|---|---|---|
| 2005/0226301 A1* | 10/2005 | Partlo | H01S 3/225 372/55 |
| 2013/0038849 A1 | 2/2013 | Weippert | |
| 2017/0052293 A1* | 2/2017 | Cangemi | G02B 1/14 |
| 2017/0052294 A1* | 2/2017 | Cangemi | C09J 5/02 |
| 2018/0151360 A1* | 5/2018 | Wang | H01L 27/1296 |
| 2020/0371437 A1* | 11/2020 | Chevalier | G03F 7/2059 |

\* cited by examiner

CAPPED BLOCKING COATING FOR LASER OPTICS

This application claims the benefit of priority under 35 U.S.C. § 119 of U.S. Provisional Application Ser. No. 63/164,755 filed on Mar. 23, 2021, the content of which is relied upon and incorporated herein by reference in its entirety.

FIELD OF TECHNOLOGY

The present disclosure relates generally to optical systems, and more specifically to capped blocking coatings for laser optics.

BACKGROUND

Optical systems may have various applications in research, medical procedures, and fabrication and microfabrication processes, such as photolithography, among other examples. For instance, an optical system may include one or more laser light sources, such as an excimer laser generating ultraviolet (UV) or deep ultraviolet (DUV) light, that may be used to expose or apply laser light to a material, such as a substrate. Excimer lasers may produce light in or near the UV spectral region with relatively high peak and average powers and relatively high energies, thereby enabling, for example, photolithography procedures with improved resolution. Due to the energies of the laser light produced by such optical systems, however, various components of the system may be subject to degradation.

SUMMARY

The methods, apparatus, and devices of this disclosure each have several new and innovative aspects. This summary provides some examples of these new and innovative aspects, but the disclosure may include new and innovative aspects not included in this summary.

The described techniques relate to improved methods, systems, devices, or apparatuses that support a capped blocking coating for laser optics. An optical system may include one or more laser light sources, such as an excimer laser generating UV or DUV light, that may be used to expose or apply laser light to a substrate. Due to the energies of the laser light produced by such optical systems, however, various components of the system may be subject to degradation. As an example, UV light may pass through various optics (e.g., mirrors, lenses, windows) of the system. Due to the one or both of the reflection or the refraction of the UV light in and around such optics, when the UV light interacts with other components of the system (e.g., components that seal a laser chamber or other components), the components may degrade over time. This may require repairs to the degraded components and cause inoperability of the optical system, operational down time, and the like.

Generally, the described techniques provide for an optical system including an optically transmissive substrate (e.g., a substrate that at least partially transmits light, for example, in the UV spectrum) having a protective coating on one surface and a blocking coating on another surface. For example, the optically transmissive substrate may be a laser optic (e.g., a calcium fluoride ($CaF_2$) laser optic) including a laser chamber window or lens. A first surface of the optically transmissive substrate may be coated with a protective material (e.g., an anti-reflective coating, a protective coating) to protect the substrate from damage caused by UV light. The substrate may further include a blocking coating, such as an annular blocking coating, on a second surface that is opposite the first surface. The blocking coating may be between about 60 and 120 nanometers (nm) in some examples and may be capped by a silicate layer (e.g., having a thickness of about 10 to 20 nm) that protects the blocking coating from damage (e.g., abrasive damage, impact damage, environmental exposure). In some aspects, the blocking coating may be adhered to the second surface of the substrate by an adhesive layer, including, for example, a metallic layer that promotes adherence of the blocking coating to the second surface of the substrate. The blocking coating may protect one or more components of an optical system from UV laser light. As an example, the optically transmissive substrate (e.g., a laser optic) may be secured in place by one or more supports (e.g., supporting structures), and a sealing component (e.g., an O-ring) may be positioned between the capping layer and the support(s). The sealing component may seal a laser chamber that is filled with one or more gasses under pressure (e.g., relatively higher pressure), where the optically transmissive substrate may be a laser chamber window (e.g., at one end of the laser chamber). The inclusion of the blocking coating on the substrate may prevent or reduce the sealing component from being exposed to the UV laser light, thereby reducing or preventing degradation of the sealing component by the UV laser light and enhancing operational longevity of the optical system, among other benefits.

A system is described. The system may include an optically transmissive substrate comprising a protective coating on a first surface and a blocking coating on a second surface that is opposite the first surface, wherein the protective coating is configured to protect the optically transmissive substrate from at least ultraviolet laser energy, and wherein the blocking coating has a first thickness that is less than about 280 nanometers and is adhered to a subset of the second surface. In some examples, the system may include a capping layer covering the blocking coating that is on the subset of the second surface and having a second thickness less than the first thickness of the blocking coating. In some examples, the system may include a sealing component positioned between the capping layer and a structure configured to support the optically transmissive substrate.

A method is described. The method may include applying a protective coating for protecting an optically transmissive substrate from at least ultraviolet laser energy to a first surface of the optically transmissive substrate, applying an adhesive layer over at least a subset of a second surface of the optically transmissive substrate that is opposite the first surface, wherein the adhesive layer has a first thickness, applying a blocking coating over the adhesive layer, wherein the blocking coating has a second thickness that is greater than the first thickness of the adhesive layer and that is less than about 280 nanometers, and applying a capping layer over the blocking coating, wherein the capping layer has a third thickness less than the second thickness of the blocking coating.

An apparatus is described. The apparatus may include a substrate that is optically transmissive to ultraviolet light, a protective layer applied to a first surface of the substrate, wherein the protective layer is configured to protect the substrate from at least ultraviolet laser energy, and a metallic adhesion layer applied to a subset of a second surface of the substrate that is opposite the first surface. In some examples, the apparatus may include an annular blocking layer applied over the metallic adhesion layer, wherein the annular blocking layer has a first thickness between about 60 nanometers and about 120 nanometers and is configured to block the ultraviolet light. In some example, the apparatus may include an annular silicate capping layer applied over the annular blocking layer, wherein the annular silicate layer has a second thickness less than about 60 nanometers.

DETAILED DESCRIPTION

Figure 1:
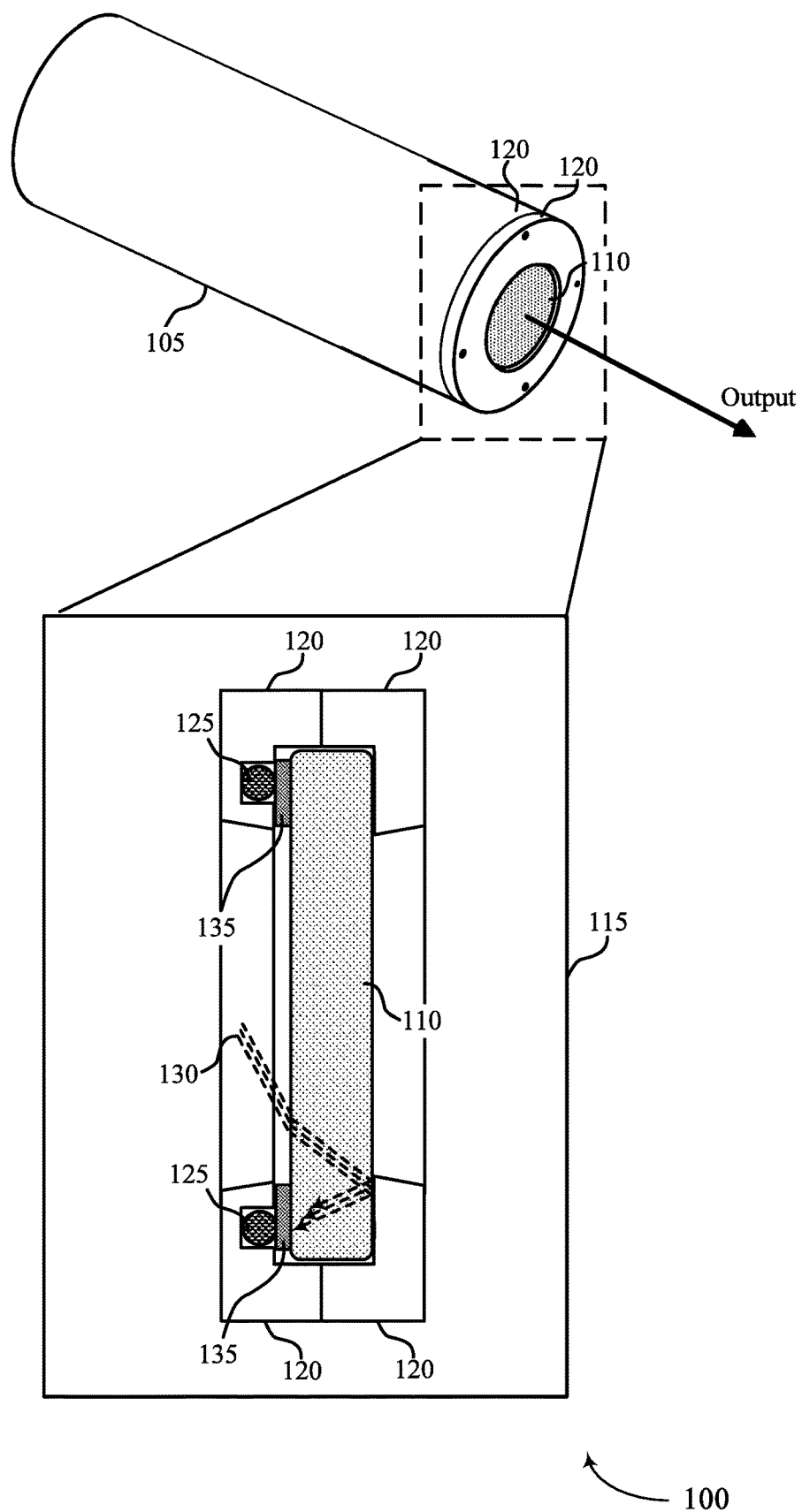
FIG. 1 illustrates an example of an optical system that supports a capped blocking coating for laser optics in accordance with aspects of the present disclosure.

Optical systems may include various optical components, including laser light sources, optical elements that include transmissive or refractive elements (e.g., lenses, windows, prisms, beam splitters), and other structural components (e.g., for supporting, holding, or positioning the optical elements). As one example, an optical system may include an excimer laser having a window (e.g., a calcium fluoride ($CaF_2$) substrate) that is optically transmissive to ultraviolet (UV) or deep ultraviolet (DUV) laser light. In such cases, the window may be secured or fixed in place by some support (e.g., supporting components). The laser source may operate using one or more pressurized gasses within a laser chamber, where excitation of the gas molecules may produce the output of the excimer laser. Accordingly, the window (e.g., positioned at some portion of the laser chamber) may be placed against a sealing component, such as an O-ring, that seals the laser chamber when the optical window is secured and that is capable of withstanding the pressurization of the chamber.

The sealing components, however, may be relatively sensitive to UV light compared to the other components and may degrade when exposed to UV light (e.g., stray or scattered UV light) present in the optical system. Specifically, stray UV light may be incident on the window and may be refracted, reflected, or both within the window material, potentially being directed toward the sealing component. When the stray UV light is incident upon the sealing component, the sealing component may begin to degrade (e.g., from the energy of scattered UV laser light). The degradation of the sealing component may, in turn, result in gas leaking from the laser chamber, causing malfunction and operational downtime of the optical system (e.g., to replace or repair the sealing component). As such, improved designs to avoid the degradation of sealing or other components of an optical system may be desirable to improve the operational longevity and reduce inoperability of the optical system, among other benefits.

As described herein, to prevent or reduce the degradation of components of the optical system (e.g., the sealing component or other components), the window may include a blocking coating to protect the sealing component from incident laser light (e.g., based on the placement and composition of the blocking coating). Specifically, the blocking coating may be applied to a surface of the window, where the blocking coating may be configured to block UV light (e.g., about 193 nm light) from being incident upon or otherwise affecting component(s) that seal a laser chamber and to prevent or reduce the degradation of the sealing components. In addition, the blocking coating may further include a capping layer (e.g., applied over the blocking coating) to protect the blocking coating from damage caused by handling or contacting the window (e.g., impact damage, abrasive damage). Additionally or alternatively, the capping layer may protect the blocking coating from environmental exposure (e.g., a surrounding environment of one or more gasses that may, for example, react with the blocking coating). Thus, the capping layer applied on top of the blocking coating may further improve the durability of the window. In addition, the capping layer may enable a relatively reduced amount of blocking coating material to be applied to the substrate (e.g., compared to blocking coatings that are not capped or other relatively thicker blocking coatings), thereby reducing costs associated with coating the substrate with the blocking coating.

In one example, the blocking coating may be adhered to the window using an adhesion layer (e.g., an about 10 nanometer (nm) adhesion layer including chromium (Cr)) that is applied to a surface of the window. The window may further include a relatively thin blocking aluminum layer (e.g., an about 80 nm aluminum (Al) blocking layer), which may be capped with a silicate capping layer (e.g., an about 20 nm $SiO_2$ layer). In such cases, the combination of a relatively thinner aluminum blocking layer and the $SiO_2$ capping layer may result in a more durable surface of the window. The window, including the capping layer over the blocking coating may, for example, be capable of withstanding cleaning (e.g., wiping) during manufacture without significant damage (e.g., scratches). In addition, the silicate-capped blocking coating may prevent any significant amount of particles from the blocking coating flaking (as may be the case when the capping layer is excluded). Therefore, the capped blocking coating described herein may provide a window or other optical element that may be handled, installed, mounted, or unmounted (e.g., in the optical system) without damage or with negligible damage.

Aspects of the disclosure are initially described in the context of optical systems and optical components. Further examples of silicate-capped blocking coatings are then provided. Aspects of the disclosure are further illustrated by and described with reference to apparatus diagrams and flowcharts that relate to a capped blocking coating.

This description provides examples, and is not intended to limit the scope, applicability or configuration of the principles described herein. Rather, the ensuing description will provide those skilled in the art with an enabling description for implementing various aspects of the principles described herein. As can be understood by one skilled in the art, various changes may be made in the function and arrangement of elements without departing from the application.

It should be appreciated by a person skilled in the art that one or more aspects of the disclosure may be implemented in a system to additionally or alternatively solve other problems than those described herein. Further, aspects of the disclosure may provide technical improvements to other different (e.g., "conventional") systems or processes as described herein. However, the description and appended drawings include example technical improvements resulting from implementing aspects of the disclosure, and accordingly do not represent all of the technical improvements provided within the scope of the claims and the disclosure.

FIG. 1 illustrates an example of an optical system 100 that supports a capped blocking coating for laser optics in accordance with aspects of the present disclosure. The optical system 100 may include one or more components including, for example, a laser source 105. In some cases, the laser source 105 may be an example of an excimer laser (e.g., an "excited dimer" laser) or other type of laser. The optical system 100 may be used for various applications of UV laser light (e.g., electromagnetic radiation with a wavelength, k, between about 10 nm to about 400 nm) or DUV laser light (e.g., electromagnetic radiation with a wavelength, $\lambda$, of about 193 nm or about 248 nm, among other examples).

Excimer lasers may produce light in or near the UV spectral region with relatively high energies and high peak and average powers. In such cases, the laser source 105 may include a laser chamber that contains pressurized gasses (e.g., under relatively high pressure compared to atmospheric pressure). The gasses may include a noble gas (e.g., argon gas, krypton gas, xenon gas) and another, more reactive gas (e.g., fluorine gas, chlorine gas). Upon applying electrical stimulation to the pressurized gasses in the laser chamber, an excimer may be generated, resulting in laser light in the UV range. In some examples, the laser light generated by an excimer laser (e.g., the laser source 105) may have a wavelength between about 126 nm and about 351 nm. In one example, an excimer laser using argon and fluorine gas (e.g., ArF gas) may generate UV laser light, for example, at or near a wavelength of 193 nm, whereas an excimer laser using krypton and chlorine gas (e.g., KrCl gas) may generate UV laser light, for example, at or near a wavelength of 222 nm. In other examples, an excimer laser using krypton gas (e.g., $Kr_2$ gas) may generate laser light at or near a wavelength of 146 nm, an excimer laser using krypton and fluorine gas (e.g., KrF gas) may generate laser light at or near a wavelength of 248 nm, and an excimer laser using Xenon monochloride gas (e.g., XeCl gas) may generate laser light at or near a wavelength of 308 nm. Other gasses and combinations of gasses are possible for generating different wavelengths of laser light, and the examples provided herein should not be considered limiting to the scope covered by the claims or the disclosure.

The laser source 105 may include a window (e.g., a laser chamber window) enabling the output of the laser light. The laser chamber window may include or be an example of an optically transmissive substrate 110 (e.g., a substrate that is optically transmissive for at least some wavelengths of light such as UV light). For example, the optically transmissive substrate 110 may include calcium fluoride ($CaF_2$) and may have a relatively low absorption coefficient and relatively high damage threshold, enabling, for example, efficient transmission of UV light, or DUV light, or both. In other examples, the optically transmissive substrate 110 may include magnesium fluoride ($MgF_2$) or a metal fluoride material. In any case, the optically transmissive substrate 110 may include one or more materials that are relatively durable to laser light (e.g., UV laser light, DUV laser light, or other wavelengths of laser light). Additionally, the optically transmissive substrate 110 may also have various properties that support the application of the optically transmissive substrate 110 as an optical window for the laser chamber (among other applications), including relatively low dispersion, relatively low fluorescence, heat resistance, and chemical resistance, to name a few examples. In some examples, calcium fluoride optics may be ideal for a broad range of UV, visible, or infrared (IR) applications, and may have a relatively low refractive index. The optically transmissive substrate 110 may include some other materials different than calcium fluoride that have some of the same or similar properties as calcium fluoride. Thus, the examples of the optically transmissive substrate 110 including a calcium fluoride material are provided as an example and should not be considered limiting to the scope covered by the claims or the disclosure.

In some examples, the laser source 105 (e.g., an excimer laser) may be used in various applications. For instance, the optical system 100 may be incorporated or used in a variety of applications that process or analyze samples using UV light. As one example, the optical system 100 may be used for fabrication and microfabrication applications including lithography (e.g., photolithography). In other examples, the optical system 100 may be used for the inspection of semiconductors, for medical procedures (e.g., laser-assisted in situ keratomileusis (LASIK) procedures), among other examples.

Due to the energies associated with the laser source 105, the optically transmissive substrate 110 may include one or more protective coatings on at least one surface of the optically transmissive substrate 110. For example, optical elements may be coated to improve transmission or reflection for some wavelengths of light, polarization states, or the like. In some applications, the optically transmissive substrate 110 may be subject to relatively high intensity radiation from UV or DUV light. As such, the optically transmissive substrate 110 may include a coating that protects the optically transmissive substrate 110 from UV or DUV energy, thereby enhancing the durability of the optically transmissive substrate 110 and increasing the operational longevity of the optical system 100. Additionally or alternatively, the coating of the optically transmissive substrate 110 may have one or more optical properties, such as anti-reflective properties, that relatively reduce reflection of incident light and improve the efficiency of light propagating through the optically transmissive substrate 110, among other benefits. In some examples, the optically transmissive substrate 110 including the one or more protective coatings may be referred to as protectively-coated calcium fluoride (PCCF) or some other terminology. Additionally or alternatively, the protective coating applied to at least one surface of the optically transmissive substrate 110 may be referred to as a PCCFx coating or some other terminology.

In some cases, the protective coating applied to at least one surface of the optically transmissive substrate 110 may perform so well (e.g., enhance the durability, and therefore extend the operational lifetime, of the optically transmissive substrate 110) that other components of the optical system 100 may begin to degrade before the optically transmissive substrate 110. For instance, as illustrated by a cross-sectional view 115 of the laser source 105, optical elements of the optical system 100 may be supported in or by (e.g., mounted in) one or more support components 120 and fixed in some position. Specifically, the optically transmissive substrate 110 may be supported (e.g., held in place) at an end of the laser source 105 by the support component 120 (e.g., surrounding at least some portions of the optically transmissive substrate 110). The laser source 105 may further include one or more sealing components 125 used to seal the pressurized gas within the laser chamber of the laser source 105. For instance, the sealing component 125 may be an example of an O-ring, an annular ring, or other component that is capable of sealing and withstanding the relatively high-pressures of the laser chamber. In some examples, the sealing component 125 may be an example of a synthetic rubber and fluoropolymer elastomer that may have some chemical resistance. In other examples, the sealing component 125 may be an example of an O-ring including one or more other synthetic rubber materials (e.g., nitrile), silicone material, or the like. When the optically transmissive substrate 110 is secured by the support component 120, the sealing component 125 may be at least partially compressed between the optically transmissive substrate 110 and the support component 120, sealing the laser chamber (e.g., which may then be pressurized with gas, such as ArF gas).

The sealing component 125, however, may be sensitive to UV light and subject to degradation when exposed to UV light (e.g., stray UV light 130) present in the optical system 100. As one illustrative example, stray UV light 130 may be incident on the optically transmissive substrate 110. The stray UV light 130 may be refracted within the optically transmissive substrate 110 and, in some cases, may be directed toward the sealing component 125 (e.g., through one or more reflections or refractions). Should the stray UV light 130 be incident upon the sealing component 125, the sealing component 125 may degrade (e.g., from the energy of scattered 193 nm laser light), which may occur instantly as well as over time. The degradation of the sealing component 125 may result in gas leakage from the laser chamber (e.g., from cracking or general reduced sealing capability of the sealing component 125), resulting in operational downtime of the optical system 100 (e.g., to replace or repair the sealing component 125). Additionally or alternatively, the degradation of the sealing component 125 may result in the movement of the optically transmissive substrate 110, potentially causing misalignment of the optically transmissive substrate 110 and affecting the operation of the optical system 100.

To prevent or reduce the degradation of components of the optical system 100, including at least the sealing component 125, the optically transmissive substrate 110 may include a capped blocking coating 135 that protects the sealing component 125 from incident laser light (e.g., the stray UV light 130). Specifically, the capped blocking coating 135 may be configured to block UV light (e.g., 193 nm DUV light) from being incident upon or otherwise affecting the sealing component 125, preventing or limiting the degradation of the sealing component 125. The capped blocking coating 135 may include a capping layer (e.g., applied over a first layer of the capped blocking coating 135) that protects the capped blocking coating 135 from, for example, damage caused by handling the optically transmissive substrate 110, further improving the durability of the optically transmissive substrate 110 (e.g., in addition to the protective coating). The capping layer is further described with reference to FIGS. 3 and 4, among other sections of the disclosure.

In some examples of different alternatives other than those described in the present disclosure, a laser chamber window may include a blocking coating, but may exclude the capping layer described herein. Such blocking coatings may include, for example, aluminum (e.g., having a thickness of about 300 nm) adhered to a surface of the substrate using an adhesion layer. However, such blocking coatings may have a relatively soft surface and may be easily scratched with handling (e.g., during manufacturing or by an end user). The scratching may be caused or further exacerbated, for example, by cleaning (e.g., wiping) a surface of the substrate. In other examples, the blocking coating may be damaged as a result of routine installation of the optical component. In any case, scratching or other damage to the aluminum coating may generate particles from flaking, among other issues, which may affect the optical efficiency of an optical system 100. In particular, contamination on a clear aperture portion of the substrate from flaking may cause premature failure of the laser source 105 or may result in decreased downtime of the optical system 100, or both.

Thus, as described in the present disclosure, the capped blocking coating 135 (e.g., a capped aluminum blocking coating) of the optically transmissive substrate 110 may include a capping layer (e.g., a silicate capping layer) that is applied over the aluminum blocking coating, where the aluminum blocking coating is configured to protect at least the sealing component 125. In one example, the optically transmissive substrate 110 may include an adhesion layer (e.g., an about 10 nm thick chromium (Cr) adhesion layer) applied to a surface of the optically transmissive substrate 110. The optically transmissive substrate 110 may further include a relatively thin blocking aluminum layer (e.g., an about 80 nm thick aluminum (Al) blocking layer), which is capped with a silicate capping layer (e.g., an about 20 nm thick $SiO_2$ layer). In such cases, the combination of a relatively thinner aluminum blocking layer and the silicate capping layer may result in a more durable surface of the optically transmissive substrate 110 (e.g., compared to optics having an about 300 nm aluminum blocking layer without a capping layer). The optically transmissive substrate 110 including the capping layer of the capped blocking coating 135 may, for example, be capable of withstanding cleaning (e.g., wiping) during manufacture without significant defects (e.g., scratches). Further, the silicate-capped blocking coating 135 may not generate any significant amount of particles from the blocking coating flaking off. Therefore, the capped blocking coating 135 described herein may increase manufacturing yields and reduce down time, among other benefits. Additionally the optically transmissive substrate 110 may be handled, installed, mounted, or unmounted (e.g., in the optical system 100) without damage or with minor damage. Therefore, the optically transmissive substrate 110 including the capped blocking coating 135 may experience an increased average optic lifetime due to less particle contamination.

In some cases, the materials of the capped blocking coating 135 (e.g., a blocking layer and a capping layer) or an adhesive layer, or a combination thereof, may be selected to reduce or prevent reactivity with the reactive gas of the excimer laser chamber. For instance, where the laser source 105 includes an ArF excimer laser, both aluminum and $SiO_2$ may not react with fluorine in the ArF gas in the laser chamber, whereas other blocking coating materials may react with the fluorine gas. As such, the capped blocking coating 135 described herein may advantageously withstand extended exposure to the pressurized fluorine gas inside the ArF laser chamber. In some cases, the capped blocking coating 135 (e.g., a metal blocking layer or film) may include other materials (e.g., metals) with similar lower reactivity to fluorine as aluminum. In some cases, other adhesion layers and materials similar to chromium may be used to adhere the blocking coating 135 to a surface of the optically transmissive substrate 110.

In addition, due to the inclusion of the capped blocking coating 135, the laser energy from the stray UV light 130 may be prevented from affecting one or more sealing components 125 of the optical system 100. That is, the capped blocking coating 135 may prevent some degradation of the sealing component 125 (e.g., an O-ring), enabling operational longevity of the laser source 105 and optical system 100. In such cases, the protective coating on one surface of the substrate may ensure the substrate is durable enough to withstand the high energies of the UV or DUV light, and the blocking coating on the other, opposite surface may ensure that other components of the laser source 105 are protected from the UV laser energy.

Although some aspects of the optical system 100 have been described with reference to excimer lasers, UV and DUV light, the optical system 100 may include other types of lasers and other wavelengths of light not explicitly described herein. That is, the optically transmissive substrate 110 and the capped blocking coating 135 may be configured for use with various other laser or optical systems.

Figure 2:
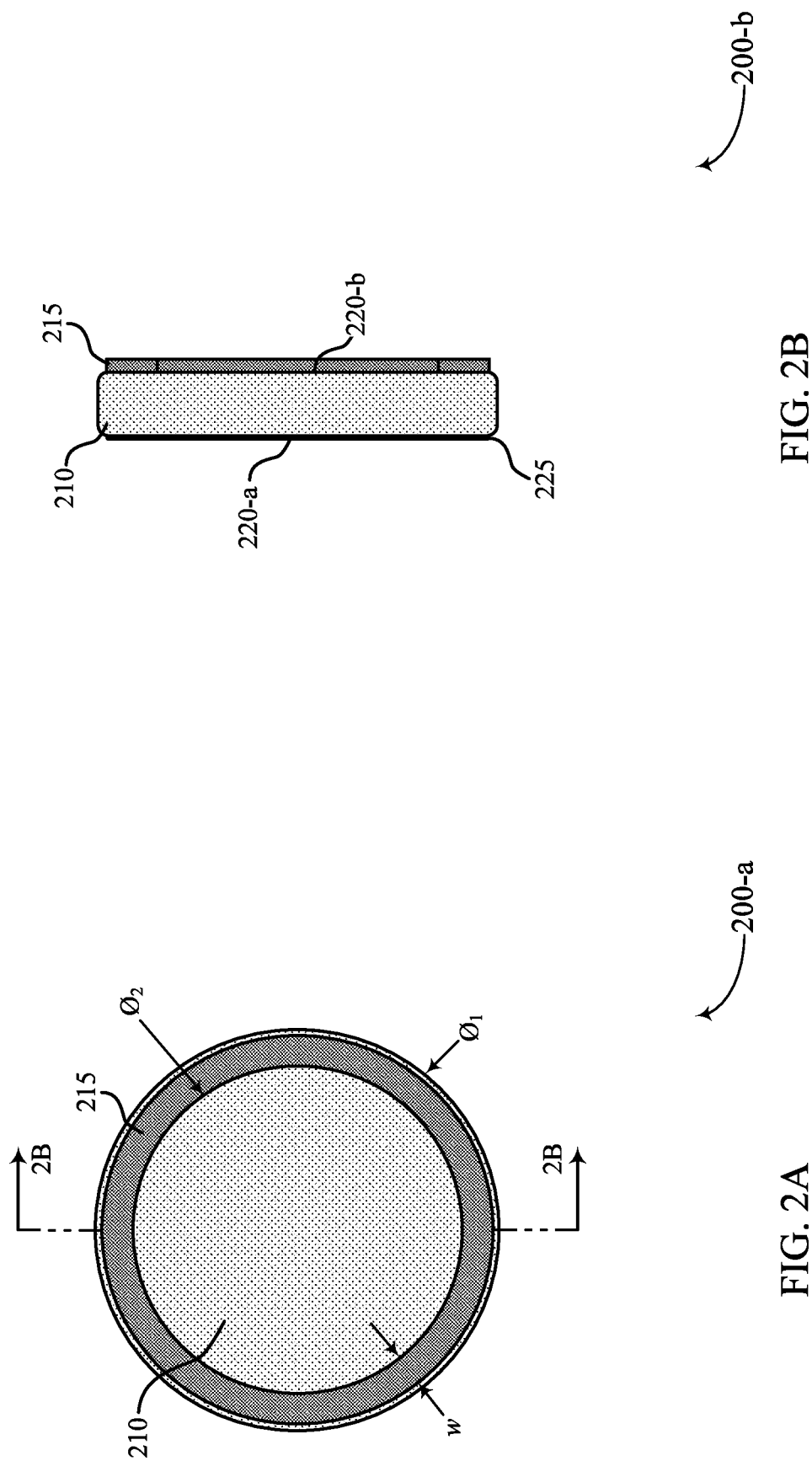
FIGS. 2A and 2B illustrate an example of an optically transmissive substrate that supports a capped blocking coating for laser optics in accordance with aspects of the present disclosure.

FIGS. 2A and 2B illustrate an example of a coated substrate 200 (e.g., coated substrate 200-a, 200-b) that supports capped blocking coating for laser optics in accordance with aspects of the present disclosure. For example, FIG. 2A may illustrate a view of one side of the coated substrate 200-a. Additionally, FIG. 2B may illustrate a cross-sectional view of the coated substrate 200-b. The coated substrate 200-a and 200-b may include a substrate 210 and a capped blocking coating 215 (e.g., a silicate-capped aluminum blocking coating). The substrate 210 may be an example of an optically transmissive substrate 110 described with reference to FIG. 1. Similarly, the capped blocking coating 215 may be an example of the capped blocking coating 135 described with reference to FIG. 1 (e.g., a silicate-capped aluminum blocking coating). As such, although the capped blocking coating 215 is illustrated as a single layer, coating, or film, the blocking coating may include one or more layers of materials, including, for example, at least a blocking layer and a capping layer. The coated substrate 200-a and 200-b may accordingly be an example of an optical element, such as a laser chamber window, included in an optical system. The coated substrate 200-a and 200-b may illustrate an example of an aluminum blocking coating that is capped by a silicate layer, where the blocking coating is configured to protect one or more components from UV laser light, and the silicate capping layer is configured to protect the blocking coating from damage (e.g., impact damage, abrasive damage, environmental exposure).

As illustrated by FIG. 2A, the substrate 210 may be circular in shape in some examples, and the capped blocking coating 215 may have an annular or ring-like shape on one surface of the substrate 210 in some examples. The capped blocking coating 215 on the surface of the substrate 210 may be approximately positioned or located at or near an outer edge of the substrate 210. That is, an outer diameter of the capped blocking coating 215 may be located substantially at the edge of the substrate or within some distance of the edge of the substrate 210.

In some examples, the substrate 210 may include some rounding (e.g., bevel) of an edge, and the outer diameter the capped blocking coating 215 may accordingly be substantially near the rounded edge of the substrate 210. In some cases, the bevel of the substrate 210 may be about 1 millimeter (mm), and the capped blocking coating 215 may thus be about 1 mm away from an edge of the substrate 210. Additionally or alternatively, there may be some area on the surface of the substrate 210 that excludes the capped blocking coating 215, which may be based on how the substrate 210 (e.g., including the capped blocking coating 215) is manufactured. As an example, an exclusion zone may be defined for the substrate 210, where the exclusion zone may correspond to a location, area, or both, on the surface of the substrate 210 were some tooling may be used to support the substrate (e.g., when the substrate is machined, when the capped blocking coating 215 is applied, among other examples). As an example, the area on the surface of the substrate 210 that excludes the capped blocking coating 215 (e.g., the exclusion zone) may be about 2 mm or less. Thus, in some cases, the capped blocking coating 215 may accordingly be about 3 mm or less from an edge of the substrate 210 (e.g., including both the bevel and the exclusion zone).

In some examples, the capped blocking coating 215 may be applied to the surface of the substrate based on a position or location of other optical elements or components within an optical system. Specifically, and as described with reference to FIG. 1, the coated substrate 200-a may be an example of a window of an excimer laser chamber, and the coated substrate 200-a may be positioned (e.g., secured, attached, fixed) relative to or against one or more sealing components that seal the laser chamber when under pressurization. Thus, the position of the blocking coating on the surface of the substrate 210 may be based on a corresponding location (e.g., radius) at which the sealing component is configured to be in contact with the substrate 210. Put another way, the capped blocking coating 215 may be applied to the surface of the substrate 210 such that the capped blocking coating 215 is configured to be between the substrate 210 and a sealing component (or some other component) of the optical system.

Similarly, one or more dimensions of the capped blocking coating 215 may be based on the position, the size, or both of other components of the optical system (e.g., the sealing component). As an example, although the outer diameter of the capped blocking coating 215 may be at or near an edge of the substrate 210, an inner diameter of the blocking coating, $Ø_2$, may be based on a diameter of the substrate, $Ø_1$ (e.g., the inner diameter of the blocking coating, $Ø_2$, may be some percentage of the diameter of the substrate, $Ø_1$). In addition, the inner diameter of the blocking coating, $Ø_2$, may also be based on a size of a sealing component or a location of the sealing component relative to the substrate 210 (e.g., corresponding to a location at which the sealing component may be in contact with the surface of the substrate 210), or both. Thus, the blocking coating may have an annular width, w, that is based on the size or position of other components in an optical system, where the annular width may be configured to ensure the components are protected from UV energy by the capped blocking coating 215. In some examples, the annular width, w, may have a range of dimensions based on the diameter of the substrate, $Ø_1$. In some aspects, the diameter of the substrate, $Ø_1$, may be about 50 mm and the inner diameter of the blocking coating, $Ø_2$, (which may correspond to an outer diameter of a clear aperture of the coated substrate 200-a) may be 40 mm, and the annular width, w, may be about 10 mm. In other examples, the diameter of the substrate, $Ø_1$, may be 40 mm, and the inner diameter of the blocking coating, $Ø_2$, may be 36 mm, and the annular width, w, may be about 4 mm. It is contemplated that the annular width w may range from about 1 mm to about 20 mm, or about 2 mm to about 15 mm, or about 5 mm to about 15 mm, or about 8 mm to about 10 mm. However, other dimensions of the substrate 210 and the capped blocking coating 215 may be possible, and the exemplary values provided herein should not be considered limiting to the scope covered by the claims or the disclosure.

The cross-sectional view of the coated substrate 200-b provided by FIG. 2B may illustrate various coatings on different surfaces 220 of the substrate 210. As an example, a first surface 220-a of the substrate 210 may include a coating 225 (e.g., a protective coating) and a second surface 220-b (that is opposite the first surface 220-a) may include the capped blocking coating 215. The coating 225 on the first surface 220-a may be an example of a coating configured to protect the optically transmissive substrate from at least ultraviolet laser energy. For example, the coating may be an anti-reflective or other coating that is configured for preventing damage from UV light (e.g., 193 nm DUV laser light), which may provide some protection to the substrate 210 from UV energies, thereby enhancing the durability of the coated substrate 200-a, 200-b. The capped blocking coating 215 (e.g., a capped aluminum blocking coating) on the second surface 220-b of the substrate 210 may, in some cases, be adhered to the second surface using an adhesion layer. In other examples, the capped blocking coating 215 may be applied directly to the second surface 220-b of the substrate 210 (e.g., without the adhesion layer). As described in further detail with regard to FIGS. 3 and 4, the blocking layer may include an aluminum layer (e.g., an about 80 nm aluminum layer) that is capped by a silicate layer (e.g., an about 10 nm $SiO_2$ layer), where the silicate layer may be configured to protect the aluminum blocking coating from various types of damage when handling the coated substrate 200-a, 200-b, further enhancing the durability of the coated substrate 200-a, 200-b.

Figure 3:
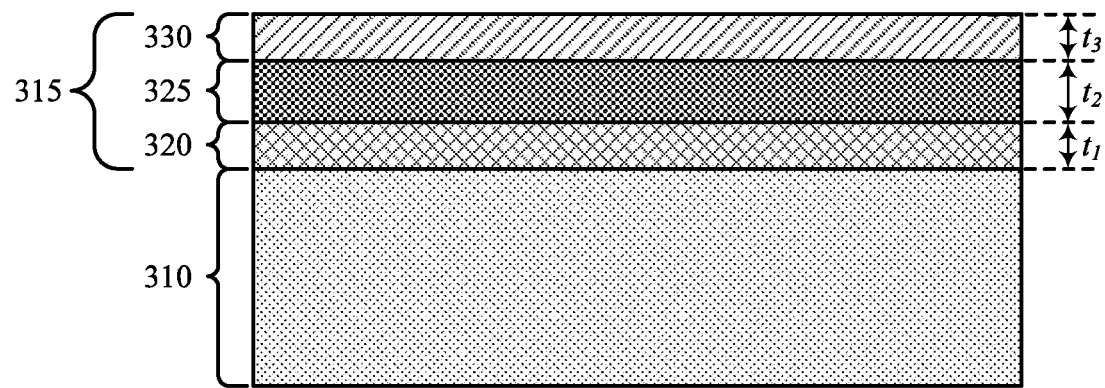
FIG. 3 illustrates an example of an optically transmissive substrate that supports a capped blocking coating for laser optics in accordance with aspects of the present disclosure.

FIG. 3 illustrates an example of a coated substrate 300 that supports a capped blocking coating for laser optics in accordance with aspects of the present disclosure. The coated substrate 300 may include a substrate 310 (e.g., an optically transmissive substrate) and layers 315 that are configured as a capped blocking coating. The layers 315 may include a first layer 320 (e.g., an adhesion layer, an adhesive layer), a second layer 325 (e.g., a blocking layer), and a third layer 330 (e.g., a capping layer). However, different numbers of layers 315 are possible, and the composition, thickness, or properties, or other characteristics, or any combination thereof, of each layer may be different than the examples provided herein. Additionally, a layer as described herein may, in some cases, be equivalent to a coating, or a film (e.g., a thin film), or both, and these terms may be used interchangeably. For example, a layer applied to the substrate 310 or on top of another layer may be applied as a film (e.g., a thin film applied via a deposition process). Similarly, the layer, when applied, may coat a subset of the substrate or the other layer, and may accordingly be referred to as a coating.

The coated substrate 300 of FIG. 3 may illustrate an example of a portion of a substrate 310 that is coated to protect one or more components of an optical system from laser light (e.g., UV laser light). For example, the substrate 310 may be an example of an optically transmissive substrate 110 or substrate 210 described with reference to FIGS. 1, 2A, and 2B, and the substrate 310 may be an example of a calcium fluoride ($CaF_2$) optical component (e.g., a window). The layers 315 may be an example of or include the capped blocking coating 135 or the capped blocking coating 215 described with reference to FIGS. 1, 2A, and 2B.

As described in further detail elsewhere, multiple layers 315 may be applied to a portion or subset of the substrate 310, where the layers 315 may have an annular shape positioned near an edge of the substrate 310. Accordingly, the coated substrate 300 illustrated by FIG. 3 may be an example of a cross section of the coated substrate 300 that includes the layers 315, whereas other portions of the substrate 310 not shown may have a different number of layers applied (e.g., fewer, more, none) or may have different types of coatings, layers, or films applied to one or more surfaces of the substrate 310. In one example, the substrate 310 may include multiple layers 315 applied to a first surface of the substrate 310, as well as one or more other layers (e.g., protective coatings, anti-reflective coatings) applied to at least one other surface of the substrate 310 (e.g., a second surface of the substrate 310, where the second surface is opposite the first surface).

The layers 315 applied to the surface of the substrate 310 may be configured for at least partially blocking laser light (e.g., UV laser light), and also include at least one protective layer that enhances the durability of the layers 315, thereby enabling operational longevity for the coated substrate 300 (e.g., a laser optic, a lens, a window). The first layer 320 applied to the first surface of the substrate 310 may include an adhesion layer (which may also be referred to as an adhesive layer, coating, or film).

For example, the first layer 320 may be or include one or more materials that promote the adhesion of the second layer 325 to the substrate 310. The first layer 320 may have a first thickness, $t_1$, that, in some examples, may be at least about 5 nm or may be between about 5 nm and 20 nm in thickness, or about 7 nm and 15 nm in thickness (e.g., as measured from the first surface of the substrate 310). In some aspects, the first layer 320 may be about 10 nm thick. The first layer 320 may be a metallic adhesive layer (e.g., including one or more metals or metallic materials) applied to the substrate 310, which may enhance or improve the adhesion of the second layer 325 to the substrate 310. In some examples, however (e.g., as described with reference to FIG. 4), the first layer 320 may be optional. In some aspects, the first layer 320 may include a chromium (Cr) adhesive layer, coating, or film. In some cases, the use of chromium as an adhesive layer (e.g., the first layer 320) may enable relatively fast and efficient application of the first layer 320 to the surface of the substrate 310 (e.g., without heating during a deposition process). In other examples, the first layer 320 may include a nickel (Ni) adhesive layer, coating, or film. Additionally or alternatively, the first layer 320 may include a nickel chromium material (e.g., a nickel chrome alloy), a metal material, a metal alloy material, or the like. That is, other materials that have some similar properties or characteristics (e.g., compared to chromium) may be used as part of the first layer 320. For instance, because the substrate 310 may be used as an optical window (e.g., a part of a laser chamber of an excimer laser system), one or more materials of the first layer 320 may be selected to avoid or reduce reactivity with one or more gases that are under pressure within the laser chamber.

The second layer 325 applied to the surface of the substrate 310 (e.g., over or on top of the first layer 320) may be a blocking layer (which may also be referred to as a blocking coating or film). The second layer 325 may include a material configured to at least partially block UV laser light from affecting one or more components of an optical system. The second layer 325 may have a second thickness, $t_2$, that may, in some examples, be between about 50 and 280 nm (e.g., as measured from a surface of the first layer 320). A thickness greater than about 280 may be prone to flaking, which may affect the functionality of the substrate 310 (e.g., one or more flakes may interact with incident light, such as in the example where the substrate 310 is a laser optic). In some aspects, the second layer 325 may be about 80 nm to 200 nm thick, or about 100 nm to 150 nm thick. In some examples, the second thickness $t_2$ may be different than (e.g., greater than) the first thickness $t_1$.

The second layer 325 may be a metallic blocking coating (e.g., including one or more metals or metallic materials) that at least partially blocks or reflects UV light. In some aspects, the second layer 325 may at least partially absorb UV light (e.g., where some light may be absorbed and reflected by the material of the blocking coating). The second layer 325 may be aluminum (Al) or some other material configured to at least partially block UV light (e.g., having a wavelength of about 193 nm). In some examples, the second layer 325 may be a nickel chromium material, a metallic material, a metal alloy material, a metal oxide material, a chromium oxide material, or some other material. For example, one or more other materials that have some similar properties or characteristics (e.g., compared to aluminum) may be included in the second layer 325. Here, the material(s) chosen for the second layer 325 may be based on an application of the coated substrate 300 (e.g., a laser optic). As one example, the substrate may be used as a laser chamber window in an ArF excimer laser, and because aluminum may have some limited or no reactivity with fluorine in an ArF gas, the aluminum blocking coating (e.g., the second layer 325) may similarly avoid or have minimal reaction with the ArF gas.

In some cases, the thickness of the second layer 325, $t_2$, may be based on the type of material used for the blocking coating. For example, some materials may have properties that block UV light differently (e.g., better) than other materials, and some threshold thickness of the second layer 325 may accordingly be used to achieve some amount of opacity to UV light, or to keep the overall thickness of the layers 315 or the second layer 325 within some threshold thickness (e.g., a minimum thickness), among some other examples.

The third layer 330 applied to the surface of the substrate 310 (e.g., over or on top of the second layer 325) may be a capping layer (which may also be referred to as a capping coating or film). The third layer 330 may include a material configured to protect the second layer 325 from some damage or degradation (e.g., abrasive damage, impact damage, flaking, environmental exposure, or the like). Accordingly, by applying the third layer 330 over the second layer 325, the second layer 325 may have relatively increased durability (e.g., compared to coatings that exclude the capping layer), able to withstand damage that may be caused by handling the coated substrate 300. The third layer 330 may have a third thickness, $t_3$, that may be at least 10 nm or may be between about 10 nm and 20 nm in thickness, or about 12 nm and 15 nm in thickness (e.g., as measured from a surface of the second layer 325). In some aspects, the third thickness may be about 10 nm. In some examples, the third thickness $t_3$ may be different than (e.g., greater than, less than) one or both of the first thickness $t_1$ or the second thickness $t_2$. In some cases, the third layer 330 may include a silicate material (e.g., $SiO_2$) or one or more other materials. For instance, the third layer 330 may include a metallic material, a metal oxide material, or the like. In some examples, the third layer 330 may include an aluminum oxide ($Al_2O_3$) material. As similarly described herein, the material of the third layer 330 may be chosen based on an application of the coated substrate 300, where the third layer 330 (e.g., the capping layer) may be a material that reduces or avoids reactivity with one or more gasses (e.g., within a laser chamber). For instance, the material of the third layer 330 may be chosen based on a relative durability of the material that may provide protection to the second layer 325. Based on the thickness of each respective layer (e.g., $t_1$, $t_2$, $t_3$), the overall thickness of the layer 315 (e.g., as measured from the surface of the substrate 310) may, in some examples, be between about 60 and 300 nm. However, other dimensions or thickness of the layers 315 may be possible.

The application of the third layer 330 may result in the coated substrate 300 being relatively more durable to manufacturing and installation (e.g., by an end-user), therefore preventing yield losses at both a manufacturer and users. As an example, the capping layer may prevent the blocking layer from flaking or being otherwise damaged through regular handling, installation, or operation, ensuring that uncoated portions of the substrate 310 remain free of flakes or other particulate matter that could potentially interfere with high-energy laser light passing through the substrate 310. That is, by reducing an amount of contamination (e.g., metal contamination) on an uncoated portion on the surface of the optic (e.g., in a clear aperture portion of the substrate 310) may increase the expected lifetime of the coated substrate 300 in a laser system.

Figure 4:
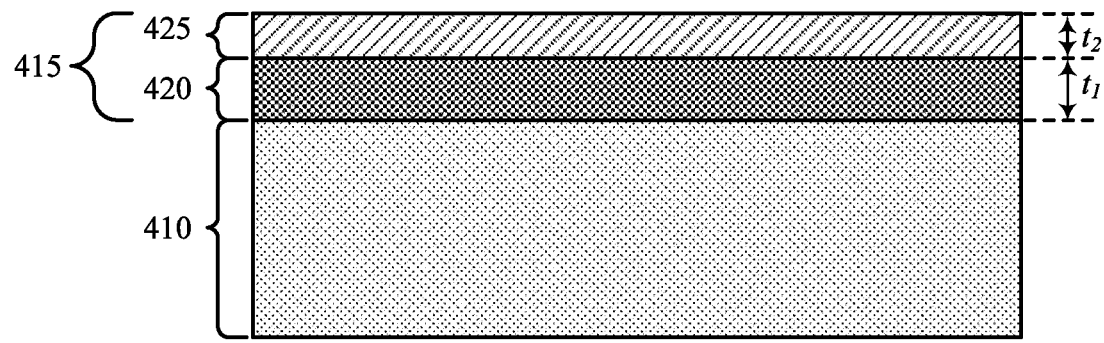
FIG. 4 illustrates an example of an optically transmissive substrate that supports a capped blocking coating for laser optics in accordance with aspects of the present disclosure.

FIG. 4 illustrates an example of a coated substrate 400 that supports a capped blocking coating for laser optics in accordance with aspects of the present disclosure. The coated substrate 400 may include a substrate 410 (e.g., an optically transmissive substrate) and layers 415 that are configured as a capped blocking coating. The layers 415 may include a first layer 420 (e.g., a blocking layer) and a second layer 425 (e.g., a capping layer). However, a different number of layers 415 are possible, and the composition, thickness, or properties, or other characteristics, or any combination thereof of each layer may be different than the examples provided herein.

The coated substrate 400 of FIG. 4 may illustrate an example of a portion of a substrate 410 that is coated to protect one or more components of an optical system from laser light (e.g., UV laser light). For example, the substrate 410 may be an example of an optically transmissive substrate 110, a substrate 210, or a substrate 310 described with reference to FIGS. 1, 2A, 2B, and 3, and the substrate 410 may be an example of a calcium fluoride ($CaF_2$) optical component (e.g., optical window). The layers 415 may be an example of or include the capped blocking coating 135, the capped blocking coating 215, or the layers 315 described with reference to FIGS. 1, 2A, 2B, and 3.

The layers 415 may be applied to a portion or subset of the substrate 410, where the layers 415 may have an annular shape positioned near an edge of the substrate 410. Accordingly, the coated substrate 400 illustrated by FIG. 4 may be an example of a cross section of the coated substrate 400 that includes the layers 415, whereas other portions of the substrate 410 not shown may have a different number of layers applied (e.g., fewer, more, none) or may have different types of coatings, layers, or films applied to one or more surfaces of the substrate 410. In one example, the substrate 410 may include multiple layers 415 applied to a first surface of the substrate 410, as well as one or more other layers or coatings (e.g., protective coatings, anti-reflective coatings) applied to at least one other surface of the substrate 410 (e.g., a second surface of the substrate 410, where the second surface is opposite the first surface).

The layers 415 applied to the surface of the substrate 410 may be configured for at least partially blocking laser light (e.g., UV laser light), and also include at least one protective layer that enhances the durability of the layers 415, thereby enabling operational longevity for the coated substrate 400 (e.g., a laser optic, a lens, a window). In some examples, layers 415 may be applied without an adhesion layer. For example, the first layer 420 (e.g., applied to a surface of the substrate 410) may include a material configured to at least partially block UV laser light from affecting one or more components of an optical system. Here, the first layer 420 may by sufficiently adhered to the surface of the substrate 410 without another intermediate layer between the first layer 420 and the surface of the substrate 410. Excluding an adhesion layer may, in some example, speed up manufacturing of the coated substrate 400, and also provide a durable capped blocking coating on the substrate 410. In some other examples, the exclusion of an adhesion layer may avoid applying materials to a surface of the substrate 410 that may potentially react with gasses associated with the application of the coated substrate 400 (e.g., the gasses within a laser chamber of an excimer laser, such as ArF).

The first layer 420 may have a first thickness, $t_1$, that may, in some examples, be between about 50 and 120 nm, or between about 60 and 100 nm (e.g., as measured from a surface of the substrate 410). In some aspects, the first layer 420 may be about 80 nm thick. The first layer 420 may be a metallic blocking coating (e.g., including one or more metals or metallic materials) that at least partially blocks or reflects UV light. In some aspects, the first layer 420 may at least partially absorb UV light (e.g., where some light may be absorbed and reflected by the material of the blocking coating). In some examples, the first layer 420 may be aluminum (Al) or some other material configured to at least partially block UV light (e.g., having a wavelength of about 193 nm).

The second layer 425 applied to the surface of the substrate 410 (e.g., over or on top of the first layer 420) may be a capping layer (which may also be referred to as a capping coating or film). The second layer 425 may include a material configured to protect the first layer 420 from some damage or degradation (e.g., abrasive damage, impact damage, flaking, or the like). Accordingly, by applying the second layer 425 over the first layer 420, the first layer 420 may have relatively increased durability (e.g., compared to coatings that exclude the capping layer), able to withstand damage that may be caused by handling the coated substrate 400. The second layer 425 may have a second thickness, $t_2$, that may be at least 10 nm or may be between about 10 nm and 20 nm in thickness, or between about 12 and 15 nm in thickness (e.g., as measured from a surface of the first layer 420). In some aspects, the third thickness may be about 10 nm. In some examples, the second thickness $t_2$ may be different than (e.g., less than) the first thickness $t_1$. In some cases, the second layer 425 may include a silicate material (e.g., $SiO_2$) or one or more other materials. Additionally, or alternatively, the second layer 425 may include an aluminum oxide ($Al_2O_3$) material.

Figure 5:
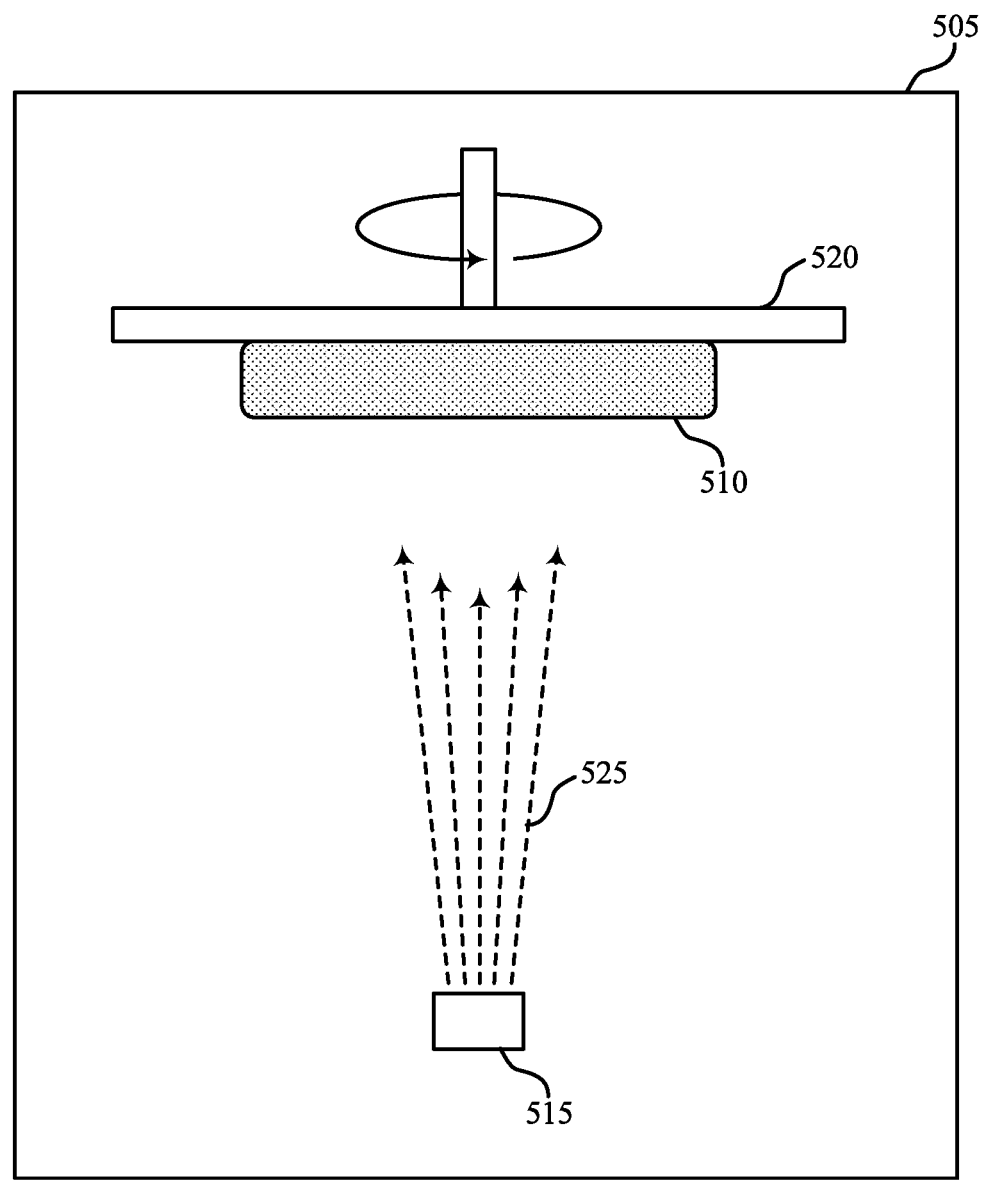
FIG. 5 illustrates an example of a device that supports a capped blocking coating for laser optics in accordance with aspects of the present disclosure.

FIG. 5 illustrates an example of a device 500 that supports a capped blocking coating for laser optics in accordance with aspects of the present disclosure. For example, the device 500 may be an example of a device configured for one or more deposition processes, such as physical vapor deposition (e.g., electron-beam physical vapor deposition), thermal deposition (e.g., thermal evaporation deposition, thermal vapor deposition, thermal chemical vapor deposition), sputtering, or other deposition processes (e.g., line-of-sight deposition processes or others), where the deposition processes may be used for applying different layers, coats, or films of material to a substrate 510. For instance, the device 500 may be used to apply one or more of a protective coating to a surface of the substrate 510, an adhesive layer to another surface of the substrate 510, a blocking coating (or blocking layer) over the adhesive layer, and a capping layer over the blocking layer. As such, the substrate 510 may be an example of an optically transmissive substrate 110, substrate 210, substrate 310, or substrate 410 described with reference to FIGS. 1, 2A, 2B, 3, and 4. For instance, the substrate 510 may be an example of a calcium fluoride ($CaF_2$) optical component (e.g., a window in a laser system).

The device 500 may include, for example, a vacuum chamber 505, one or more material sources 515, and a substrate holder 520. A material source 515 may be an example of an ingot, granules of a material, pieces of a material (e.g., pieces ranging in size from about 1 mm to 3 mm), chunks of a material, pellets of a material, or the like. The material source 515 may include one or more materials to be deposited in various layer, coatings, or thin films on or over the substrate 510. For example, the material source 515 may be an example of an aluminum material that is used for applying a blocking coating to the substrate 510. In other examples, the material source 515 may be an example of a chromium material that is used for applying an adhesive layer to the substrate 510 (e.g., prior to applying the blocking coating to the substrate 510). The material source 515 may be or include other materials, elements, compounds, or the like. In one aspect, material from the material source 515 may be sublimated in a line-of-sight stream or application (e.g., caused by an electron beam steered via electric and magnetic fields to the material source 515) from the material source 515 to the substrate 510. In other examples, the one or more materials of the material source 515 may be evaporated for deposition onto the substrate 510. As an illustrative example, an adhesion layer including a chromium (Cr) material may be sublimated when applied to the substrate 510, whereas a blocking layer including aluminum (Al) or a silicate capping layer, or both, may be evaporated when applied to the substrate 510. Here, the device may be configured to apply material to some subset or portion of the substrate 510.

In some examples, the substrate holder 520, the substrate 510, or both, may rotate, which may enable various schemes or configurations for depositing material from a material source 515 on the substrate 510. For instance, the substrate holder 520 or the substrate 510, or both, may be rotated using one or more rotation apparatuses and techniques, including, for example, epicyclic gearing (which may be referred to as planetary gearing), sun and planet gearing, or others. In any case, one or more materials 525 from the material source(s) 515 may be deposited on the substrate 510, for example, in a sequential manner such that multiple layers having various thicknesses may be deposited on the substrate 510. As illustrated in FIG. 5, the materials 525 may be deposited using the material source 515 positioned below the substrate 510. In other examples, the materials 525 may be deposited using the material source 515 positioned above the substrate 510. In some cases, the materials 525 may be deposited onto the substrate using one or more masking techniques, one or more etching techniques, or any combination thereof. As an example, one or more masks may be used for depositing one or more layers of the material 525 in a particular shape (e.g., an annular shape) onto the substrate 510.

As an illustrative example, the device 500 may be configured for applying different coatings or layers to the substrate 510. In one example, the device 500 may apply a protective layer or coating to one surface of the substrate 510. As described herein, the protective layer may include an anti-reflective coating that protects the substrate 510 from UV laser energy. Additionally, or alternatively, the device 500 may be used to apply an adhesive layer (e.g., an adhesion layer) to another surface of the substrate 510. In such cases, the adhesive layer may include one or more metallic materials used to adhere a blocking coating to the substrate 510. In one aspect, the adhesive layer may include chromium (Cr), however other materials may be used for adhering the blocking coating to the surface of the substrate 510. The device 500 may apply the adhesive coating to the substrate 510 until the adhesive layer has some thickness on the substrate 510. As an example, the adhesive layer may be applied until the adhesive layer is about 10 nm thick (e.g., measured from a surface of the substrate 510). In other examples, the thickness of the adhesive layer may be between about 5 nm and about 20 nm. In some cases, the adhesive layer may be deposited in the shape of a ring or annulus that is at or near the edge of the substrate 510. For example, the substrate 510 may have a circular shape and the adhesive layer may be applied to an outer edge of the substrate 510, leaving a portion (e.g., a clear aperture portion) of the substrate 510 without the adhesive layer and/or other coatings or layers (e.g., as illustrated with reference to FIG. 2A).

Upon depositing the adhesive layer, the device 500 may be configured for applying the blocking coating to the substrate (e.g., over the adhesive layer). The blocking coating may be applied to the substrate 510 in a manner that results in an annular blocking coating at or near the edge of the substrate 510 (e.g., by a deposition process, by a deposition process and a removal process). The blocking coating may therefore be applied to cover a subset of the substrate 510. In some examples, the blocking coating (and the material 525) may be aluminum or another material that may at least partially block UV laser light.

The blocking coating may be applied by the device 500 until the blocking coating is some thickness. For example, the blocking coating may be applied until the blocking coating is about 60 nm thick (e.g., measured from the adhesive layer previously applied to the surface of the substrate 510). In other examples, the blocking coating may be between about 50 nm and about 200 nm in thickness. In some cases, the blocking coating may be applied to the surface of the substrate 510 without first applying the adhesive layer. As such, the blocking coating may be applied to the surface of the substrate 510 and may sufficiently adhere to the surface of the substrate 510 (e.g., in the absence of the adhesive layer).

After the blocking coating is deposited on the surface of the substrate 510, a capping layer may be deposited over (e.g., on top of) the blocking coating (e.g., by a deposition process, by a deposition process and a removal process). In such cases, the capping layer may be applied to the substrate 510 in a manner that results in the annular blocking coating (at or near the edge of the substrate 510) being covered or capped by the silicate layer, where the silicate layer has the same annular shape as the blocking coating (and the adhesive layer, if applied). The silicate capping layer may therefore be applied to cover the subset of the substrate 510. In some examples, the silicate capping layer (and the material 525) may be silicon dioxide ($SiO_2$) or another material that may at least partially protect the blocking coating. For example, the $SiO_2$ layer may protect the blocking coating from damage from abrasion, impact, or other types of damage. The silicate capping layer may be applied by the device 500 until the silicate capping layer is some thickness. For example, the capping layer may be applied until the capping layer is about 10 nm thick (e.g., measured from the blocking coating layer previously applied to the surface of the substrate 510). In other examples, the silicate layer may be at least about 10 nm in thickness. In some examples, the capping layer (and the material 525) may include aluminum oxide ($Al_2O_3$) material.

In some examples, the various materials for the adhesive layer, the blocking coating, and the capping layer may be deposited or applied to the substrate 510 under one or more temperature conditions. For instance, the layers may be formed on the substrate 510 at an ambient temperature or at a room temperature. In such cases, the deposition of the layers and materials on the substrate 510 may not require or include any heat sources, thereby enabling efficient manufacture of an optically transmissive substrate that includes a capped blocking layer. In addition, the low-temperature (e.g., ambient temperature) coating processes may reduce coating chamber cycle time (e.g., compared to other coating processes and coating designs), thereby increasing manufacturing efficiency.

Figure 6:
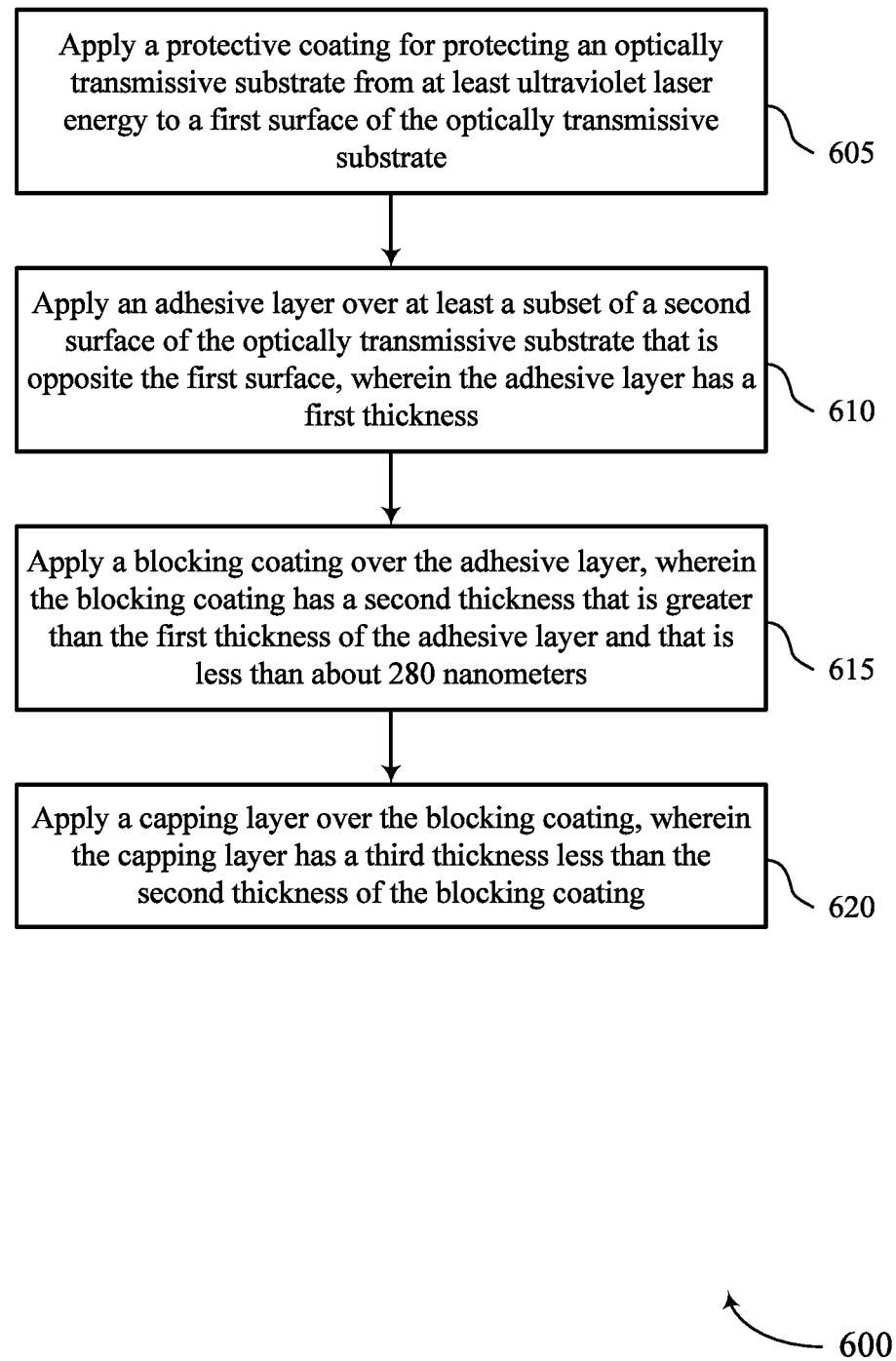
FIGS. 6 and 7 show flowcharts illustrating a method or methods that support a capped blocking coating for laser optics in accordance with aspects of the present disclosure.

FIG. 6 shows a flowchart illustrating a method 600 that supports capped blocking coating for laser optics in accordance with aspects of the present disclosure. The operations of the method 600 may be implemented by a device or its components as described herein. For example, the operations of the method 600 may be performed by a device configured for deposition processes (e.g., physical vapor deposition) as described with reference to FIG. 5. In some examples, a device may execute a set of instructions to control the functional elements of the device to perform the described functions. Additionally or alternatively, the device may perform aspects of the described functions using special-purpose hardware.

At 605, the method may include applying, to a first surface of an optically transmissive substrate, a protective coating for protecting the optically transmissive substrate from at least UV laser energy. The operations of 605 may be performed in accordance with examples as disclosed herein.

At 610, the method may include applying an adhesive layer over at least a subset of a second surface of the optically transmissive substrate that is opposite the first surface, wherein the adhesive layer has a first thickness. The operations of 610 may be performed in accordance with examples as disclosed herein.

At 615, the method may include applying a blocking coating (e.g., aluminum) over the adhesive layer, wherein the blocking coating has a second thickness that is greater than the first thickness of the adhesive layer and is less than about 280 nanometers. The operations of 615 may be performed in accordance with examples as disclosed herein.

At 620, the method may include applying a capping layer (e.g., a silicate layer) over the blocking coating, wherein the capping layer has a third thickness less than the second thickness of the blocking coating. The operations of 620 may be performed in accordance with examples as disclosed herein.

In some examples, an apparatus as described herein may perform a method or methods, such as the method 600. The apparatus may include, features, circuitry, logic, means, or instructions (e.g., a non-transitory computer-readable medium storing instructions executable by a processor) for applying a protective coating for protecting an optically transmissive substrate from at least ultraviolet laser energy to a first surface of the optically transmissive substrate, applying an adhesive layer over at least a subset of a second surface of the optically transmissive substrate that is opposite the first surface, wherein the adhesive layer has a first thickness, applying a blocking coating over the adhesive layer, wherein the blocking coating has a second thickness that is greater than the first thickness of the adhesive layer and that is less than about 280 nanometers, and applying a capping layer over the blocking coating, wherein the capping layer has a third thickness less than the second thickness of the blocking coating.

In some examples of the method 600 and the apparatus described herein, applying the adhesive layer may include operations, features, circuitry, logic, means, or instructions for applying the adhesive layer until the adhesive layer may have the first thickness, the first thickness being at least about 5 nanometers, wherein the adhesive layer comprises a metallic adhesive layer.

In some examples of the method 600 and the apparatus described herein, applying the blocking coating may include operations, features, circuitry, logic, means, or instructions for applying the blocking coating until the blocking coating may have the second thickness, the second thickness being at least about 60 nanometers, wherein the blocking coating comprises a metallic blocking layer for at least partially blocking ultraviolet light.

In some examples of the method 600 and the apparatus described herein, applying the capping layer may include operations, features, circuitry, logic, means, or instructions for applying the capping layer until the capping layer may have the third thickness, the third thickness being at least about 10 nanometers, wherein the capping layer comprises a silicon dioxide material protecting the blocking coating from impact damage, abrasive damage, environmental exposure, or any combination thereof.

In some examples of the method 600 and the apparatus described herein, each of the adhesive layer, the blocking coating, and the silicate layer may be applied in an annular shape using an electron-beam physical vapor deposition process, or a sputtering process, or a thermal deposition process, or any combination thereof.

Figure 7:
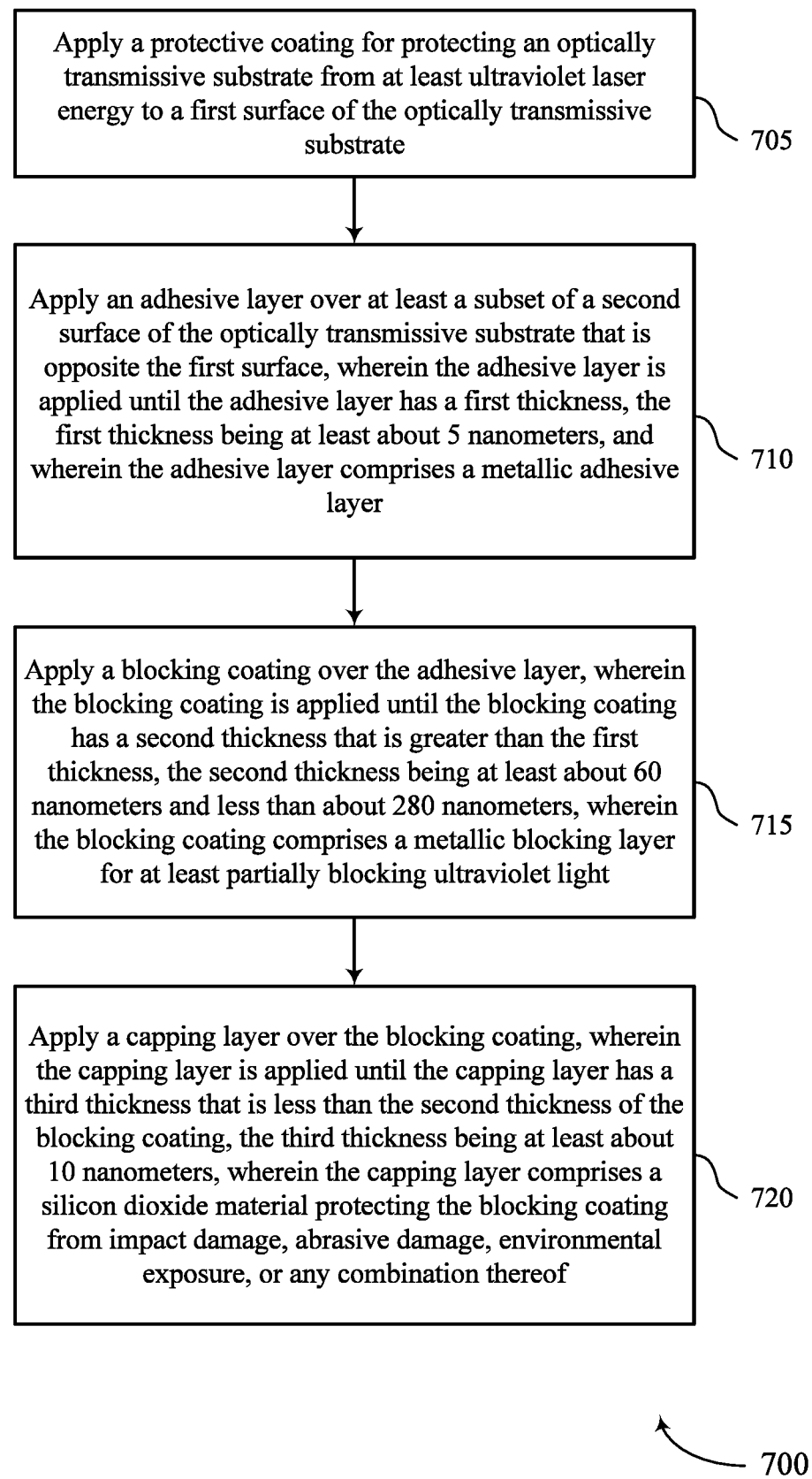

FIG. 7 shows a flowchart illustrating a method 700 that supports capped blocking coating for laser optics in accordance with aspects of the present disclosure. The operations of the method 700 may be implemented by a device or its components as described herein. For example, the operations of the method 700 may be performed by a device configured for deposition processes (e.g., physical vapor deposition) as described with reference to FIG. 5. In some examples, a device may execute a set of instructions to control the functional elements of the device to perform the described functions. Additionally or alternatively, the device may perform aspects of the described functions using special-purpose hardware.

At 705, the method may include applying a protective coating for protecting an optically transmissive substrate from at least ultraviolet laser energy to a first surface of the optically transmissive substrate. The operations of 705 may be performed in accordance with examples as disclosed herein.

At 710, the method may include applying an adhesive layer over at least a subset of a second surface of the optically transmissive substrate that is opposite the first surface, wherein the adhesive layer is applied until the adhesive layer has a first thickness, the first thickness being at least about 5 nm, wherein the adhesive layer comprises a metallic adhesive layer. The operations of 710 may be performed in accordance with examples as disclosed herein.

At 715, the method may include applying a blocking coating (e.g., aluminum) over the adhesive layer, wherein the blocking coating is applied until the blocking coating has a second thickness that is greater than the first thickness of the adhesive layer, the second thickness being at least about 60 nm and less than about 120 nm, wherein the blocking coating comprises a metallic blocking layer for at least partially blocking UV light. The operations of 715 may be performed in accordance with examples as disclosed herein.

At 730, the method may include applying a capping layer over the blocking coating, wherein the capping layer is applied until the capping layer has a third thickness less than the second thickness of the blocking coating, the third thickness being at least about 10 nm, wherein the capping layer comprises a silicon dioxide ($SiO_2$) material protecting the blocking coating from impact damage, abrasive damage, environmental exposure, or any combination thereof. The operations of 730 may be performed in accordance with examples as disclosed herein.

A system is described. The system may include an optically transmissive substrate comprising a protective coating on a first surface and a blocking coating on a second surface that is opposite the first surface, wherein the protective coating is configured to protect the optically transmissive substrate from at least ultraviolet laser energy, and wherein the blocking coating has a first thickness that is less than about 120 nanometers and is adhered to a subset of the second surface, a capping layer covering the blocking coating that is on the subset of the second surface and having a second thickness less than the first thickness of the blocking coating, and a sealing component positioned between the capping layer and a structure configured to support the optically transmissive substrate.

In some examples of the system, the blocking coating comprises one or more materials that may be configured to at least partially reflect ultraviolet light, and the first thickness may be based at least in part on a reflectivity of the one or more materials. In some examples of the apparatus, the blocking coating comprises an aluminum material, and the first thickness may be between about 60 nanometers and about 120 nanometers.

In some examples of the system, the capping layer comprises a silicon dioxide material, and the second thickness may be at least about 10 nanometers. In some examples of the apparatus, the blocking coating may be configured to protect at least the sealing component from incident ultraviolet laser energy based at least in part on a position of the sealing component.

In some examples of the system, the blocking coating comprises an annular shape having an outer diameter that may be positioned substantially near an edge of the optically transmissive substrate. In some examples of the apparatus, an inner diameter of the annular shape may be based at least in part on one or more of a size of the sealing component, a location of the sealing component relative to the optically transmissive substrate, or a diameter of the optically transmissive substrate.

In some examples, the system may include an adhesion layer positioned between the optically transmissive substrate and the blocking coating, the adhesion layer comprising a metallic layer that adheres the blocking coating to the optically transmissive substrate and having a third thickness less than the second thickness. In some examples of the apparatus, the first thickness may be about 80 nanometers, the second thickness may be about 20 nanometers, and, and the third thickness may be about 10 nanometers.

In some examples of the system, the system comprises a portion of a chamber of an excimer laser system, and the sealing component comprises an annular ring configured to withstand a pressure when the chamber may be pressurized.

An apparatus is described. The apparatus may include a substrate that is optically transmissive to ultraviolet light, a protective layer applied to a first surface of the substrate, wherein the protective layer is configured to protect the substrate from at least ultraviolet laser energy, a metallic adhesion layer applied to a subset of a second surface of the substrate that is opposite the first surface, an annular blocking layer applied over the metallic adhesion layer, wherein the annular blocking layer has a first thickness between about 60 nanometers and about 120 nanometers and is configured to block the ultraviolet light, and an annular silicate layer applied over the annular blocking layer, wherein the annular silicate layer has a second thickness less than about 60 nanometers.

In some examples of the apparatus, the metallic adhesion layer comprises chromium and may have a third thickness of about 10 nanometers. In some examples of the apparatus, the annular blocking layer comprises an aluminum material, the first thickness may be about 80 nanometers, and, and the annular blocking layer may have an inner diameter that may be based at least in part on a diameter of the substrate and an outer diameter located substantially near an edge of the substrate.

In some examples of the apparatus, the annular silicate layer comprises silicon dioxide, and the second thickness may be about 20 nanometers. In some examples of the apparatus, the ultraviolet light may have a wavelength of about 193 nanometers.

It should be noted that these methods describe examples of implementations, and that the operations and the steps may be rearranged or otherwise modified such that other implementations are possible. In some examples, aspects from two or more of the methods may be combined. For example, aspects of each of the methods may include steps or aspects of the other methods, or other steps or techniques described herein. Thus, aspects of the disclosure may provide for consumer preference and maintenance interface.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

As used herein, the term "about" means that the modified characteristic (e.g., a verb or adjective modified by the term substantially) or a related aspect (e.g., related action or function), need not be absolute but is close enough to achieve the advantages of the characteristic or related aspect (e.g., related action or function).

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), a central processing unit (CPU), an application-specific integrated circuit (ASIC), a field-programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). The functions of each unit may also be implemented, in whole or in part, with instructions embodied in a memory, formatted to be executed by one or more general or application-specific processors.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise random-access memory (RAM), read-only memory (ROM), electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A system, comprising:
   an optically transmissive substrate comprising:
      a protective coating on a first surface and a blocking coating on a second surface that is opposite the first surface, wherein the protective coating is configured to protect the optically transmissive substrate from at least ultraviolet laser energy, and wherein the blocking coating has a first thickness that is between about 60 nanometers and about 280 nanometers and is adhered to a portion of the second surface; and
      a capping layer covering the blocking coating that is on the portion of the second surface and having a second thickness less than the first thickness of the blocking coating;
   a structure configured to support the optically transmissive substrate; and
   a sealing component positioned between the capping layer and the structure configured to support the optically transmissive substrate.

2. The system of claim 1, wherein the blocking coating comprises an aluminum material.

3. The system of claim 2, wherein the first thickness is between about 60 nanometers and about 120 nanometers.

4. The system of claim 1, wherein the capping layer comprises a silicon dioxide material.

5. The system of claim 4, wherein the second thickness is between about 10 nanometers and about 20 nanometers.

6. The system of claim 1, wherein the blocking coating comprises an annular shape having an outer diameter that is positioned near an outer edge of the optically transmissive substrate.

7. The system of claim 6, wherein an annular width of the blocking coating is in a range from about 1 mm to about 20 mm.

8. The system of claim 1, further comprising:
   an adhesion layer positioned between the optically transmissive substrate and the blocking coating, the adhesion layer comprising a metallic layer that adheres the blocking coating to the optically transmissive substrate and having a third thickness less than the second thickness.

9. The system of claim 8, wherein the first thickness is about 80 nanometers, wherein the second thickness is about 20 nanometers, and wherein the third thickness is about 10 nanometers.

10. The system of claim 1, wherein the system comprises a portion of a chamber of an excimer laser system, and wherein the sealing component comprises an annular ring configured to withstand a pressure when the chamber is pressurized.

11. A method, comprising:
    applying a protective coating for protecting an optically transmissive substrate from at least ultraviolet laser energy to a first surface of the optically transmissive substrate;
    applying an adhesion layer over a portion of a second surface of the optically transmissive substrate that is opposite the first surface, wherein the adhesion layer has a first thickness;
    applying a blocking coating over the adhesion layer, wherein the blocking coating has a second thickness that is between about 60 nanometers and about 280 nanometers; and
    applying a capping layer over the blocking coating, wherein the capping layer has a third thickness that is less than the second thickness of the blocking coating.

12. The method of claim 11, wherein applying the adhesion layer comprises:
    applying the adhesion layer until the adhesion layer has the first thickness, the first thickness being between about 5 nanometers and about 20 nanometers, wherein the adhesion layer comprises a metallic adhesion layer.

13. The method of claim 12, wherein applying the blocking coating comprises:
    applying the blocking coating until the blocking coating has the second thickness, the second thickness being between about 60 nanometers and about 120 nanometers, wherein the blocking coating comprises a metallic blocking layer configured to block ultraviolet light.

14. The method of claim 13, wherein applying the capping layer comprises:
    applying the capping layer until the capping layer has the third thickness, the third thickness being between about 10 nanometers and about 20 nanometers, wherein the capping layer comprises a silicon dioxide material.

15. The method of claim 11, wherein each of the adhesion layer, the blocking coating, and the capping layer is applied in an annular shape using an electron-beam physical vapor deposition process, or a sputtering process, or a thermal deposition process, or any combination thereof.

16. An apparatus, comprising:
    a substrate that is optically transmissive to ultraviolet light;
    a protective layer applied to a first surface of the substrate, wherein the protective layer is configured to protect the substrate from at least ultraviolet laser energy;
    a metallic adhesion layer applied to a subset of a second surface of the substrate that is opposite the first surface;
    an annular blocking layer applied over the metallic adhesion layer, wherein the annular blocking layer has a first thickness between about 60 nanometers and about 120 nanometers and is configured to block the ultraviolet light; and
    an annular silicate layer applied over the annular blocking layer, wherein the annular silicate layer has a second thickness between about 10 nanometers and about 20 nanometers.

17. The apparatus of claim 16, wherein the metallic adhesion layer comprises chromium and has a third thickness of about 10 nanometers.

18. The apparatus of claim 16, wherein the annular blocking layer comprises an aluminum material, wherein the first thickness is about 80 nanometers, and wherein the annular blocking layer has an inner diameter that is based on a diameter of the substrate and an outer diameter located near an edge of the substrate.

19. The apparatus of claim 16, wherein the annular silicate layer comprises silicon dioxide, and wherein the second thickness is about 20 nanometers.

20. The apparatus of claim 16, wherein the ultraviolet light has a wavelength of about 193 nanometers.

* * * * *